(12) United States Patent
Noguchi et al.

(10) Patent No.: US 6,381,410 B1
(45) Date of Patent: Apr. 30, 2002

(54) LENS-FITTED PHOTO FILM UNIT

(75) Inventors: Osamu Noguchi; Takashi Tobioka, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/514,923

(22) Filed: Feb. 28, 2000

(30) Foreign Application Priority Data

Mar. 18, 1999 (JP) ............................................. 11-073403
Mar. 30, 1999 (JP) ............................................. 11-088832

(51) Int. Cl.⁷ ......................... G03B 17/02; G03B 17/08
(52) U.S. Cl. ............................. 396/6; 396/538; 396/29
(58) Field of Search .............................. 396/6, 27, 29, 396/535, 538

(56) References Cited

U.S. PATENT DOCUMENTS

| | | | | |
|---|---|---|---|---|
| 4,812,866 A | * | 3/1989 | Ushiro et al. | 396/6 |
| 5,576,782 A | * | 11/1996 | Kameyama | 396/6 |
| 5,875,356 A | * | 2/1999 | Moriya et al. | 396/6 |

* cited by examiner

Primary Examiner—David M. Gray
Assistant Examiner—Rochelle Blackman
(74) Attorney, Agent, or Firm—Young & Thompson

(57) ABSTRACT

A lens-fitted photo film unit includes a main body. A cassette holder chamber in the main body contains a photo film cassette. A roll holder chamber in the main body contains a roll of photo film drawn from the photo film cassette. A front cover of transparent resin covers a front of the main body. A rear cover covers a rear of the main body. The roll holder chamber has a top wall portion and an end wall portion disposed farther from the cassette holder chamber. A first light-shielding ridge is disposed to project forwards from the rear cover and to extend horizontally, overlapped with the top wall portion, for blocking entry of ambient light at the top wall portion. A second light-shielding ridge is disposed to project forwards from the rear cover and to extend vertically, overlapped with the end wall portion, for blocking entry of ambient light at the end wall portion. The second light-shielding ridge extends to the first light-shielding ridge. Also, an exposure light path is formed through the front cover and the main body, for introducing object light to the photo film. A light-shielding ridge blocks entry of ambient light into the exposure light path through portions of the front cover outside the exposure light path. Furthermore, a taking lens is disposed in front of the main body. A lens opening is formed in the front cover in front of the taking lens, for introducing object light to the taking lens. A ring-shaped blocking projection portion is disposed inside an edge of the lens opening, for blocking advance of ambient light from the front cover to the taking lens outside a predetermined incident angle range.

18 Claims, 16 Drawing Sheets

LENS-FITTED PHOTO FILM UNIT

BACKGROUND OF THE INVENTION

1. Field of the Invention

The present invention relates to a lens-fitted photo film unit. More particularly, the present invention relates to a lens-fitted photo film unit of which components disposed inside a front cover are visible externally.

2. Description Related to the Prior Art

A lens-fitted photo film unit includes assembled parts including a main body, which is pre-loaded with unexposed photo film and incorporates an exposure unit. The lens-fitted photo film unit is widely used, because photographs can be taken easily, and it can be forwarded to a photo laboratory without difficult operation.

There is an idea of designing appearance of the lens-fitted photo film unit with attractiveness and fashionableness. Although it is general to form a front cover of the lens-fitted photo film unit from black resin with a light-shielding characteristic, the idea suggests a skeleton type of the lens-fitted photo film unit in which the front cover is formed from transparent resin. The main body with a shutter mechanism and a flash unit is partially visible through the front cover externally.

The lens-fitted photo film unit known so far in the art has a structure in which the inner side is shielded from ambient light by the main body and the front cover and a rear cover both covering the main body. If the front cover becomes transparent either fully or partially, ambient light is likely to enter a space for movement of a shutter blade between a lens holder and an exposure tunnel for an exposure light path. It is also likely that ambient light enters the main body between engaged portions of a roll holder chamber of the main body and the rear cover, as the front cover is transparent and does not shield light itself at those engaged portions.

If ambient light enters the lens-fitted photo film unit through a gap between the lens holder and the exposure tunnel or between the roll holder chamber and the rear cover, the unexposed photo film is likely to be fogged, and cannot keep quality suitable for good photographing.

SUMMARY OF THE INVENTION

In view of the foregoing problems, an object of the present invention is to provide a lens-fitted photo film unit in which a front cover is transparent and also the image quality of photographs to be taken can be kept without influence of ambient light.

In order to achieve the above and other objects and advantages of this invention, a lens-fitted photo film unit includes a main body. A cassette holder chamber is formed in the main body, for containing a photo film cassette. A roll holder chamber is formed in the main body, for containing a roll of photo film drawn from the photo film cassette. A front cover is formed from transparent resin at least partially, for covering a front side of the main body. A rear cover covers a rear side of the main body. The roll holder chamber has a top wall portion and an end wall portion, the end wall portion being disposed farther from the cassette holder chamber. A first light-shielding ridge is disposed to project forwards from the rear cover and to extend horizontally, overlapped with the top wall portion, for blocking entry of ambient light at the top wall portion. A second light-shielding ridge is disposed to project forwards from the rear cover and to extend vertically, overlapped with the end wall portion, for blocking entry of ambient light at the end wall portion, the second light-shielding ridge extending to the first light-shielding ridge.

Furthermore, a first end cover portion is formed to project from the front cover, and disposed outside the end wall portion. A second end cover portion is formed to project from the rear cover and to extend along an outside of the second light-shielding ridge, disposed outside the end wall portion, for covering the end wall portion with the first end cover portion.

Furthermore, an auxiliary ridge portion is formed to project from the rear cover and to extend along a top of the first light-shielding ridge, and overlapped with a top of the top wall portion.

Furthermore, an auxiliary ridge portion is disposed inside the roll holder chamber to extend along an inside of the end wall portion, and opposed to the second light-shielding ridge.

In a preferred embodiment, the cassette holder chamber has a second top wall portion and a second end wall portion, the second end wall portion being disposed farther from the roll holder chamber. Furthermore, a third light-shielding ridge is disposed to project forwards from the rear cover and to extend horizontally, overlapped with the second top wall portion, for blocking entry of ambient light at the second top wall portion. A fourth light-shielding ridge is disposed to project forwards from the rear cover and to extend vertically, overlapped with the second end wall portion, for blocking entry of ambient light at the second end wall portion, the fourth light-shielding ridge ex-ending to the third light-shielding ridge.

In a further preferred embodiment, an exposure light path is formed through the front cover and the main body, for introducing object light to the photo film. A light-shielding member blocks entry of ambient light into the exposure light path through portions of the front cover outside the exposure light path.

The light-shielding member is opaque and has a dark color.

The main body includes an exposure tunnel through which the exposure light path extends. A shutter opening is formed in front of the exposure tunnel, for constituting the exposure light path. A shutter blade is disposed in front of the exposure tunnel in a pivotally movable manner, for providing the photo film with an exposure by opening and closing the shutter opening. A lens holder plate is disposed behind the front cover, for covering the shutter blade. A holder opening is formed in the lens holder plate, for constituting the exposure light path. The light-shielding member comprises a light-shielding ridge formed to project rearwards from an edge of the lens holder plate.

Furthermore, a taking lens is fitted at the holder opening, for focusing the object light on the photo film.

Furthermore, an electronic flash unit illuminates a photographic field with flash light. A synchro switch is disposed between the exposure tunnel and the lens holder plate, for turning on the flash unit upon actuation of the shutter blade.

According to another aspect of the present invention, a taking lens is disposed in front of the main body. A lens opening is formed in the front cover in front of the taking lens, for introducing object light to the taking lens. A blocking member is disposed inside an edge of the lens opening, for blocking advance of ambient light from the front cover to the taking lens outside a predetermined incident angle range.

The blocking member is opaque and has a dark color.

Furthermore, a lens holder plate is disposed between the main body and the front cover, for supporting the taking lens. A lens retainer plate is disposed between the lens holder plate and the front cover, for keeping the taking lens on the lens holder plate. A first opening is formed in a middle of the lens retainer plate, for introducing the object light to the taking lens. The blocking member is formed with the lens retainer plate and disposed between the edge of the lens opening and an edge of the first opening.

The blocking member is a ring-shaped projection projecting from the lens retainer plate and inserted in the lens opening.

A front end of the blocking member is disposed behind a front surface of the front cover.

In still another preferred embodiment, the lens retainer plate keeps the taking lens on the lens holder plate by being sandwiched with the taking lens between the front cover and the lens holder plate.

A front end of the blocking member is disposed in front of a front surface of the front cover.

The blocking member comprises a ring-shaped plate portion. The lens retainer plate includes an outer projection portion disposed to project rearwards from an outer edge of the ring-shaped plate portion. A flange is disposed to project from the outer projection portion away from the first opening, for contacting a rear of an edge of the lens opening. An inner projection portion is disposed to project rearwards from the first opening, for contacting a periphery of the taking lens.

Furthermore, at least one combination of a projection and a recess, of which one is formed in the lens retainer plate and a remainder is formed in the rear of the edge of the lens opening, and which are engaged with each other for retention thereof.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
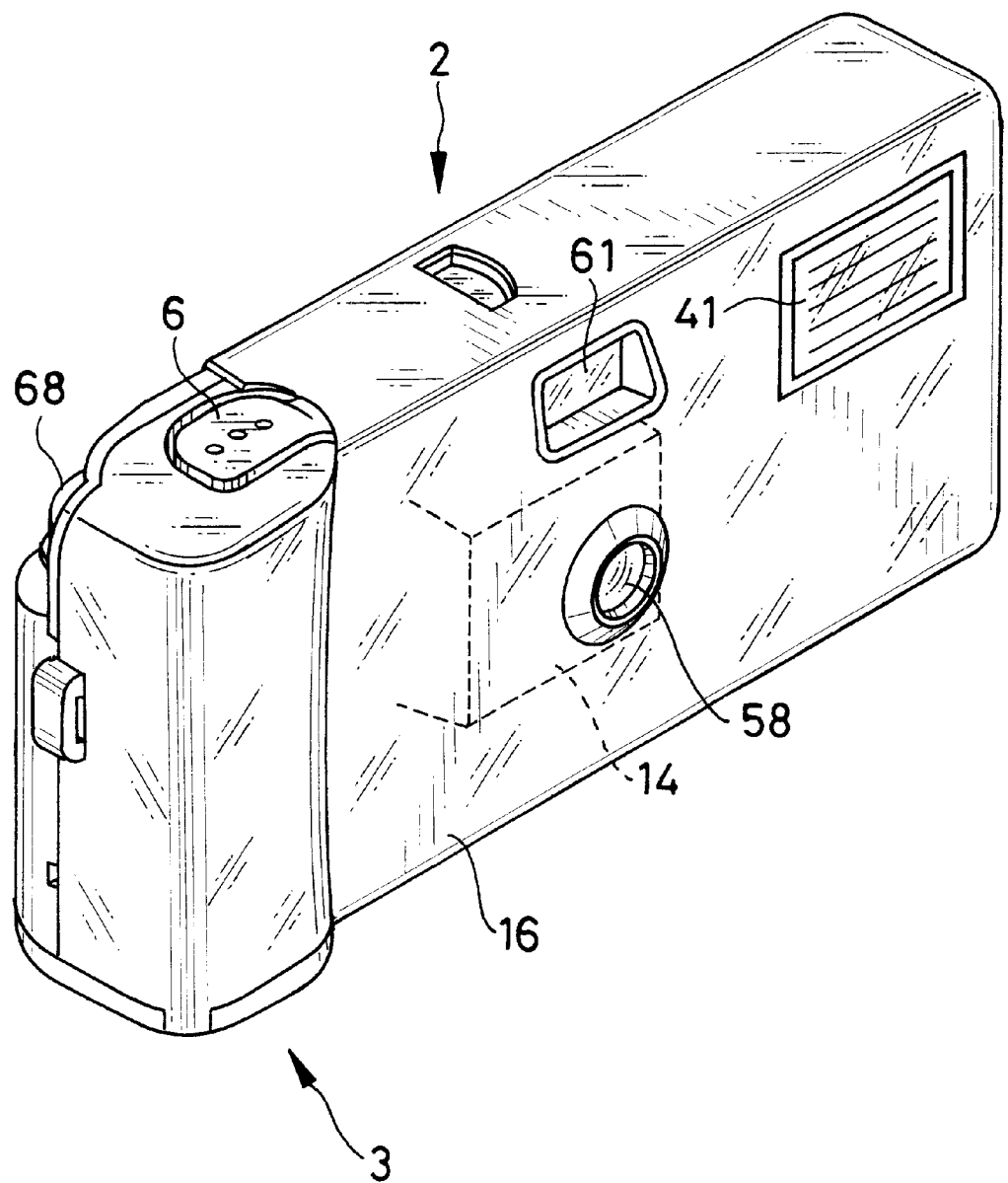
FIG. 1 is a perspective illustrating a lens-fitted photo film unit.
Figure 2:
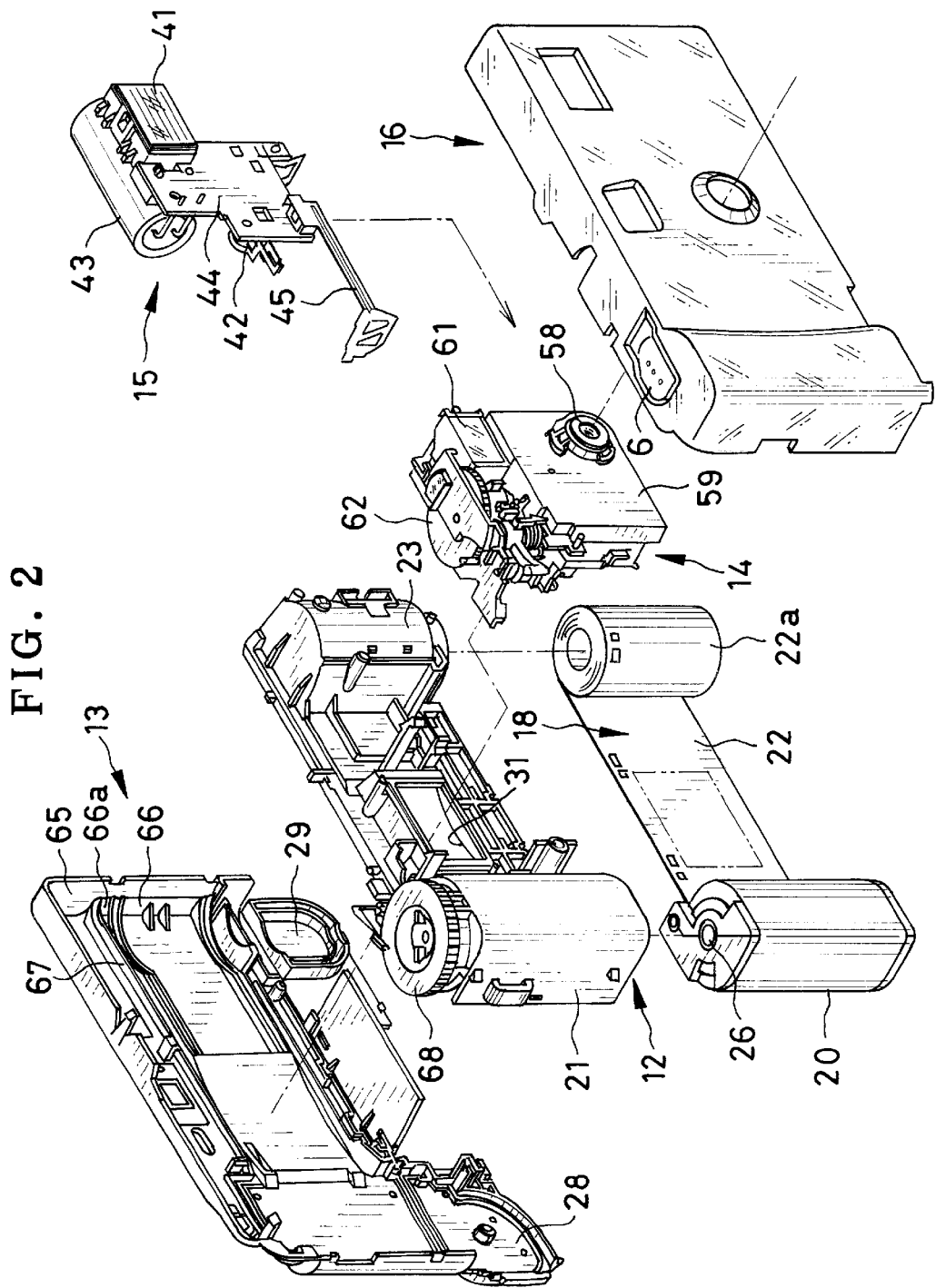
FIG. 2 is an exploded perspective illustrating the lens-fitted photo film unit.

In FIGS. 1 and 2, a lens-fitted photo film unit 2 is illustrated. The lens-fitted photo film unit 2 has a housing 3, which incorporates an exposure unit 14, an electronic flash unit 15 and a photo film cassette 18.

The housing 3 includes a main body 12, a rear cover 13 and a front cover 16. A front side of the main body 12 is provided with the exposure unit 14 and the flash unit 15. The rear cover 13 and the front cover 16 cover respectively rear and front sides of the main body 12.

The front cover 16 is secured to a front side of the main body 12. The front cover 16 is formed from transparent resin, which characterizes the lens-fitted photo film unit 2 of a skeleton type in which inner parts in the main body 12 are visible through the front cover 16.

It is to be noted that the term of "transparent" for the front cover 16 is herein used to represent an optical state in which light can be transmitted through it, and refers to a colorless transparent state, a translucent state with a certain color or gray, or the like.

A shutter release button 6 is formed with the front cover 16 by forming a channel-shaped opening therein. A push rod (not shown) is formed on a lower face of the shutter release button 6 for pushing a part of the exposure unit 14 to actuate the shutter mechanism.

The flash unit 15 is located on the front side in an upper position in the main body 12, and is constituted by a flash emitter 41, a printed circuit board 44 and a battery holder 45. The flash emitter 41 includes a flash discharge tube. The printed circuit board 44 is provided with various electric parts such as a main capacitor 43 and a synchro switch 42, which is turned on in response to actuation of the shutter mechanism.

An exposure aperture 31 is formed in the center of the main body 12. The exposure unit 14 is secured to the front of an exposure tunnel having the exposure aperture 31 in the rear. The main body 12 has a cassette holder chamber 21 and a roll holder chamber 23 between which the exposure aperture 31 is located. The cassette holder chamber 21 contains a photo film cassette shell 20 of the photo film cassette 18. The roll holder chamber 23 contains a photo film roll 22a, which is formed by winding unexposed photo film 22 drawn from the photo film cassette shell 20.

Figure 3:
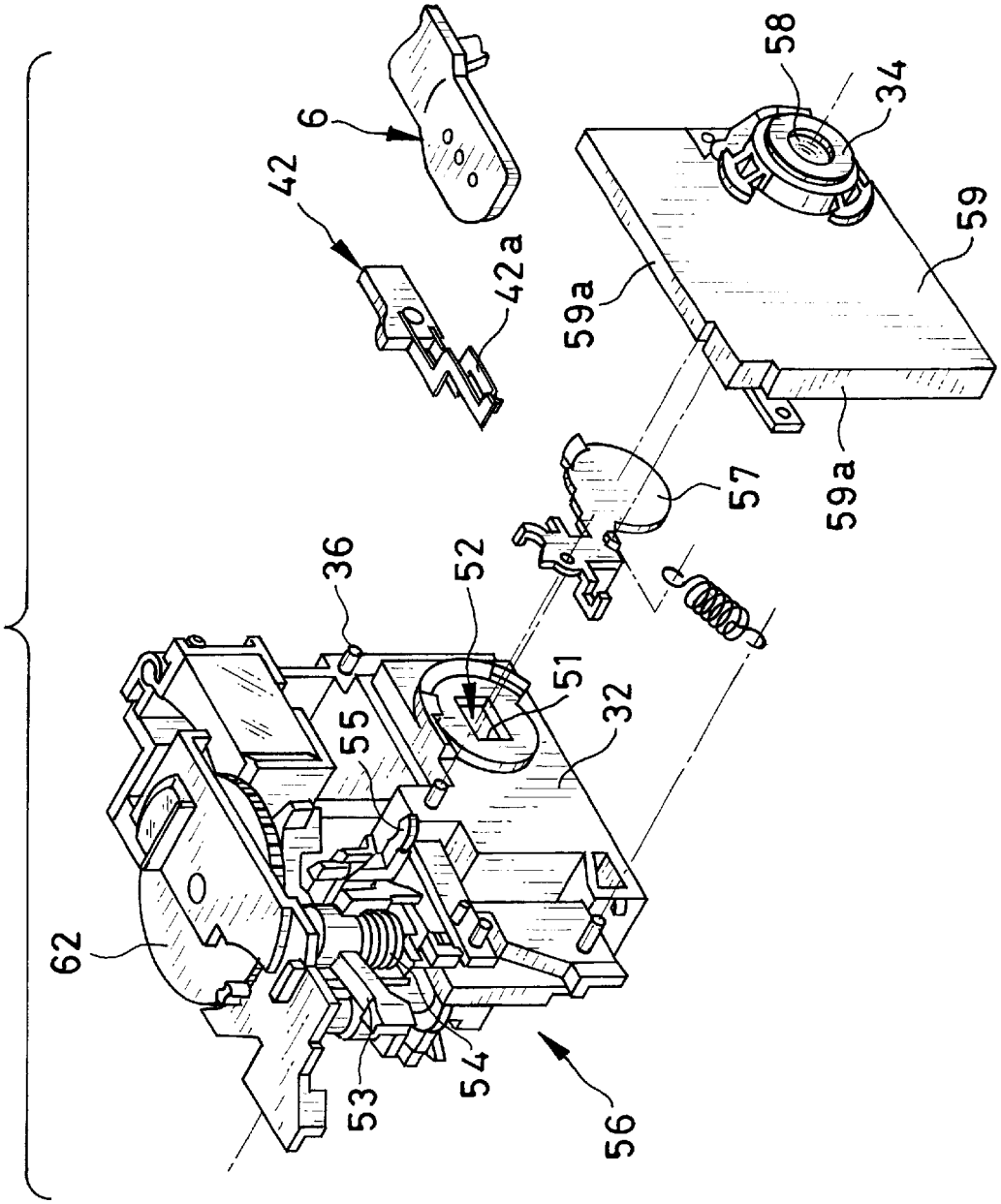
FIG. 3 is an exploded perspective illustrating an exposure unit of the lens-fitted photo film unit.

In FIG. 3, the exposure unit 14 is a combined component including an exposure light path 52, a shutter drive mechanism 56, a shutter blade 57, a lens holder plate 59, a viewfinder 61 and a frame counter disk 62. The exposure light path 52 has a shutter opening 51 in its front, and is defined inside a quadrilateral exposure tunnel 32. The shutter drive mechanism 56 includes a one-frame advancing lever 53, a coil spring 54 and a knocking lever 55. The shutter blade 57 is driven by the shutter drive mechanism 56 for opening and closing the shutter opening 51. The lens holder plate 59 covers the shutter blade 57, and also supports a taking lens 58.

Note that there is a lens retainer plate 34 that retains the taking lens 58 to the lens holder plate 59. Pins 36 protrude from the exposure tunnel 32 to position the lens holder plate 59.

Figure 4A:
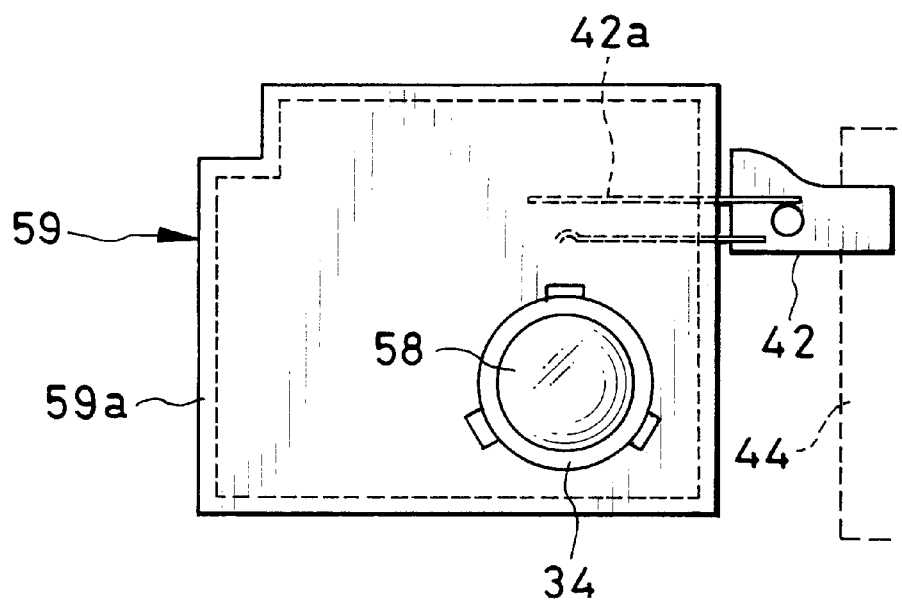
FIG. 4A is an explanatory view in front elevation, illustrating a lens holder plate and a shutter release button.
Figure 4B:
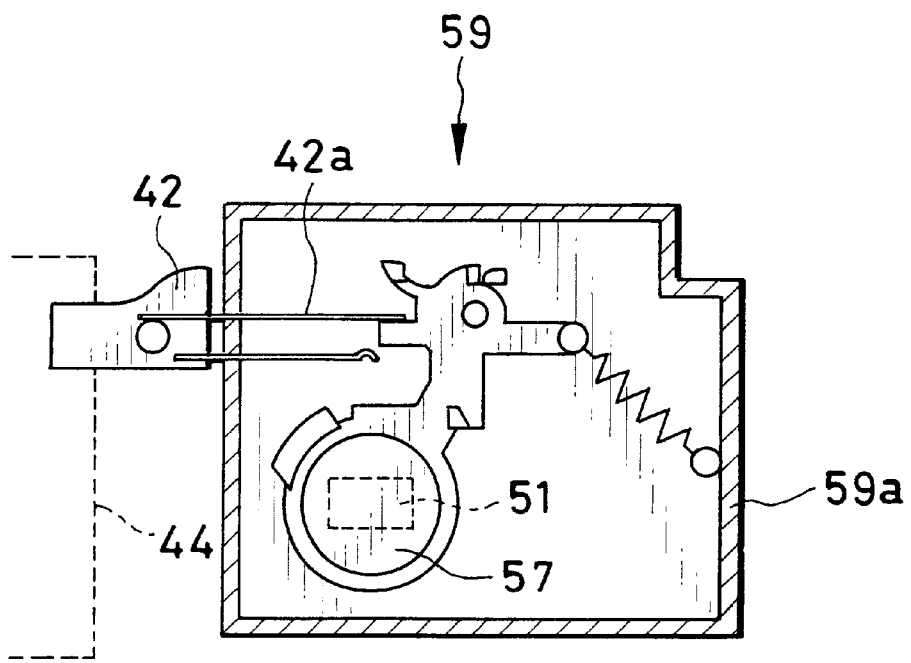
FIG. 4B is an explanatory view in front elevation, illustrating the same as FIG. 4A.
Figure 5:
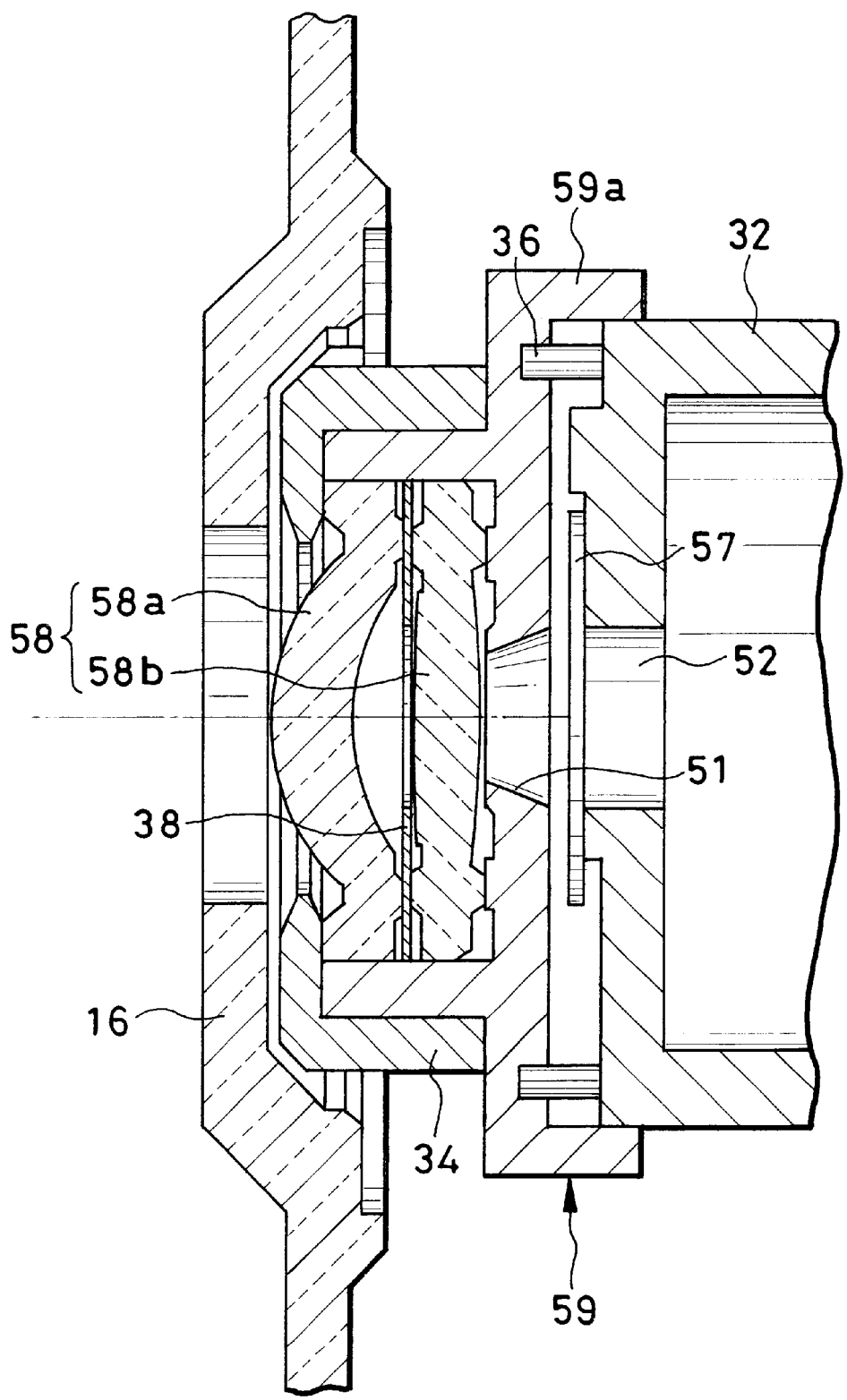
FIG. 5 is a cross section, partially broken, illustrating a front cover, a taking lens and the lens holder plate at the exposure unit.

In FIGS. 4A and 5, a light-shielding ridge 59a is formed on edges of the lens holder plate 59 to project toward the front face of the exposure tunnel 32 of the exposure unit 14. The synchro switch 42 has contact segments 42a located behind the lens holder plate 59. The light-shielding ridge 59a surrounds the shutter blade 57 and the contact segments 42a behind the lens holder plate 59. See FIG. 4B. The light-shielding ridge 59a blocks entry of ambient light into a space where the shutter blade 57 is rotatable between the lens holder plate 59 and the exposure tunnel 32 of the exposure unit 14.

The taking lens 58 is constituted by two lens elements 58a and 58b. Also, there is an aperture stop plate 38 between them for defining a range where object light can be passed.

The rear cover 13 covering the rear of the main body 12 constitutes rear walls of the cassette holder chamber 21 and the roll holder chamber 23. There are bottom lids 28 and 29 formed on a bottom edge of the rear cover 13 for closing bottom openings of the cassette holder chamber 21 and the roll holder chamber 23.

Figure 6:
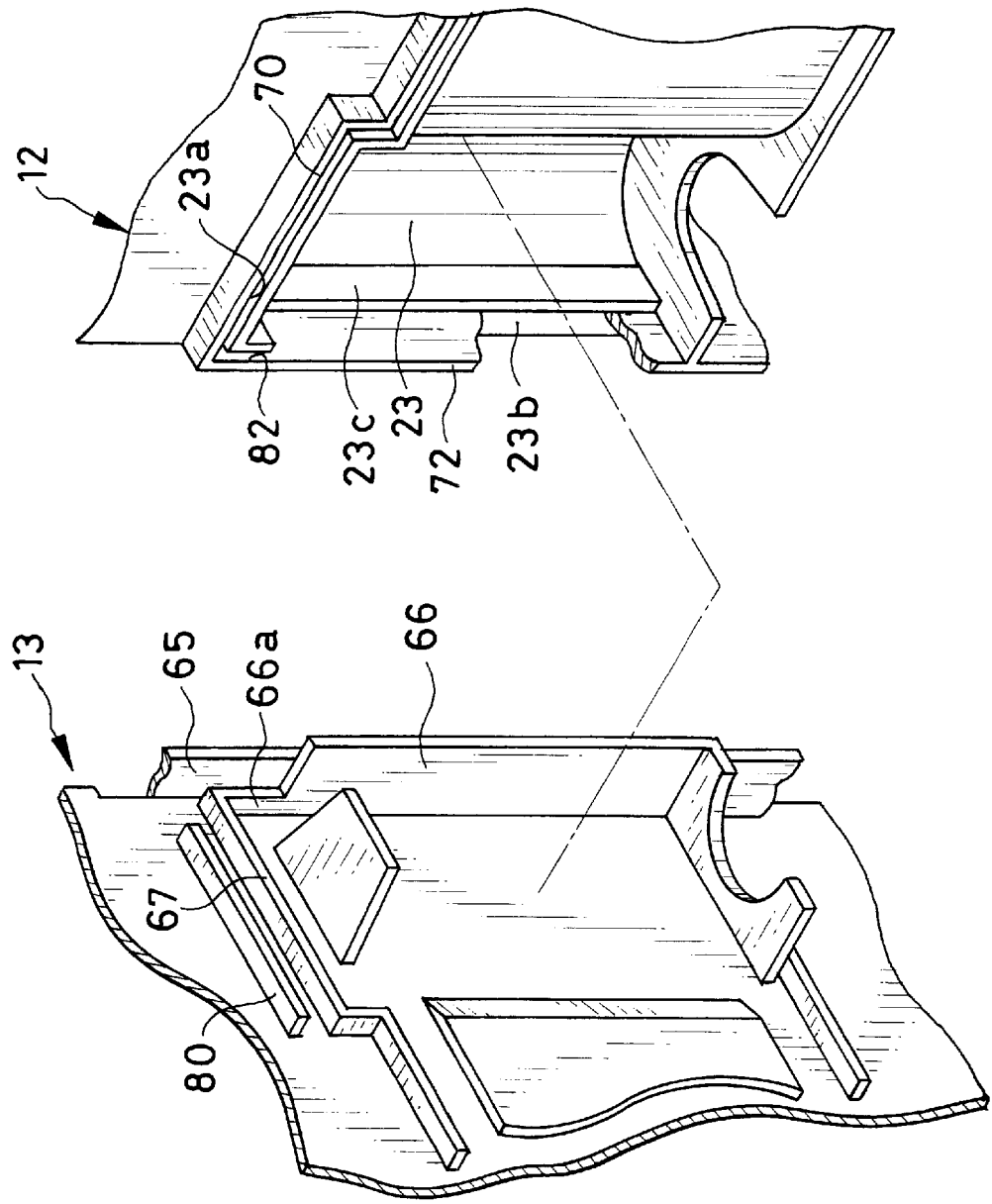
FIG. 6 is an exploded perspective, partially broken, illustrating portions of a rear cover and a main body constituting a roll holder chamber.

There is a light-shielding ridge 65 or end cover portion formed with the rear cover 13. See FIG. 7. In FIG. 6, an engaging groove 23a is formed in the main body 12 on a top wall portion 70 of the roll holder chamber 23. A light-shielding ridge 67 is formed with the rear cover 13, disposed close to the light-shielding ridge 65, and inserted in the engaging groove 23a. Also, a light-shielding ridge 66 is disposed in the rear cover 13. A light-shielding ridge 66a is formed to extend between the light-shielding ridges 66 and 67.

Note that the light-shielding ridge 66a is fitted in a gap 82 formed in the main body 12. An auxiliary ridge portion 80 is positioned on a top side of a top wall portion 70.

Figure 7:
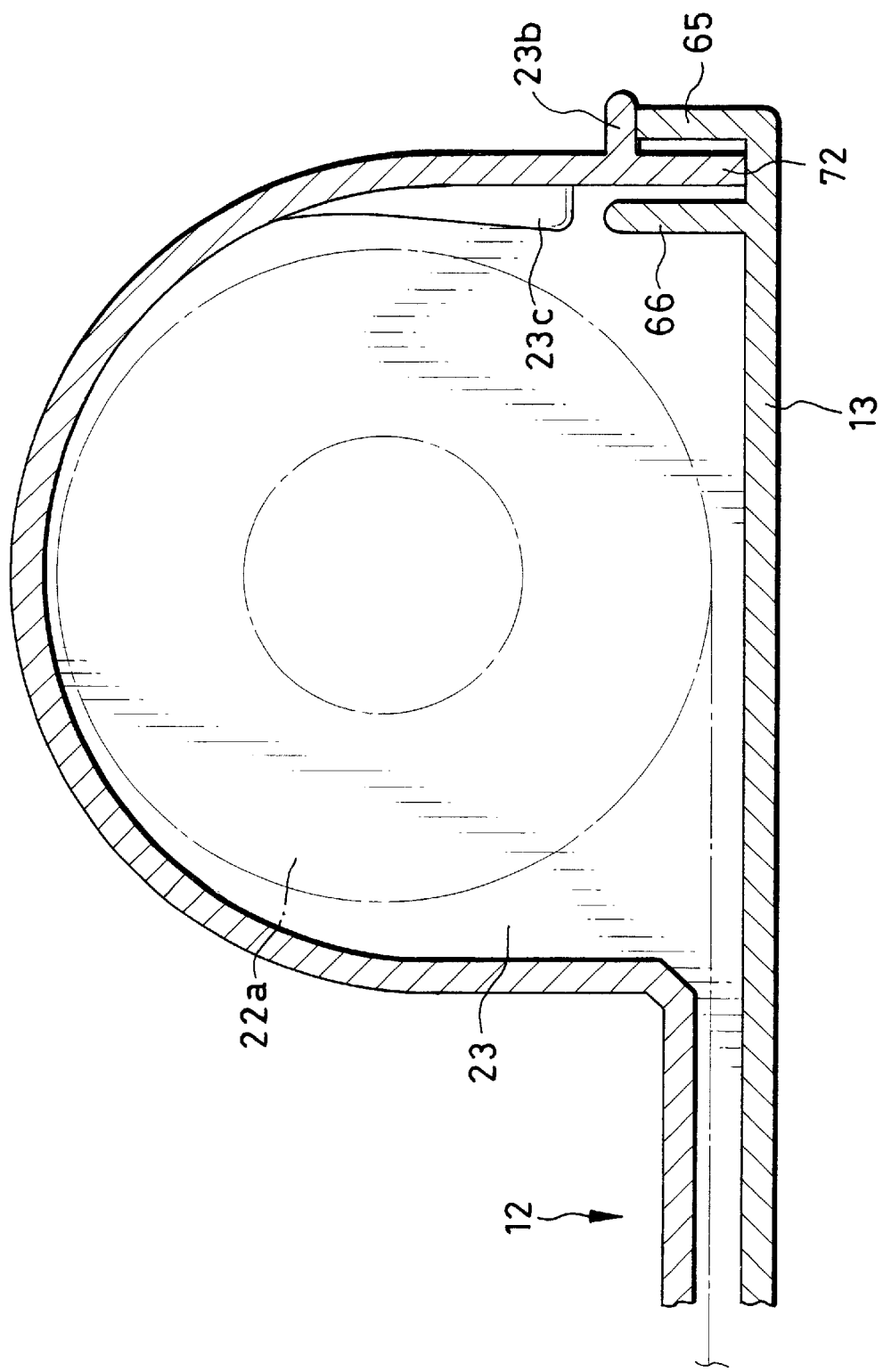
FIG. 7 is a cross section, partially broken, illustrating the roll holder chamber.

In FIG. 7, a light-shielding ridge 23b is formed outside an end wall portion 72 of the roll holder chamber 23, and projects toward the outside to close a gap between the light-shielding ridge 65 of the rear cover 13 and the roll holder chamber 23. Also a shoulder portion 23c is formed on the inside of the roll holder chamber 23.

The photo film cassette 18 to be contained in the housing 3 has a spool 26, which is rotatable within the photo film cassette shell 20. A trailer end of the photo film 22 is secured to the spool 26. A winder wheel 68 is externally rotatable in the rear wall of the housing 3. Upon rotation of the winder wheel 68, the photo film 22 is drawn frame by frame from the photo film roll 22a contained in the roll holder chamber 23.

Figure 8:
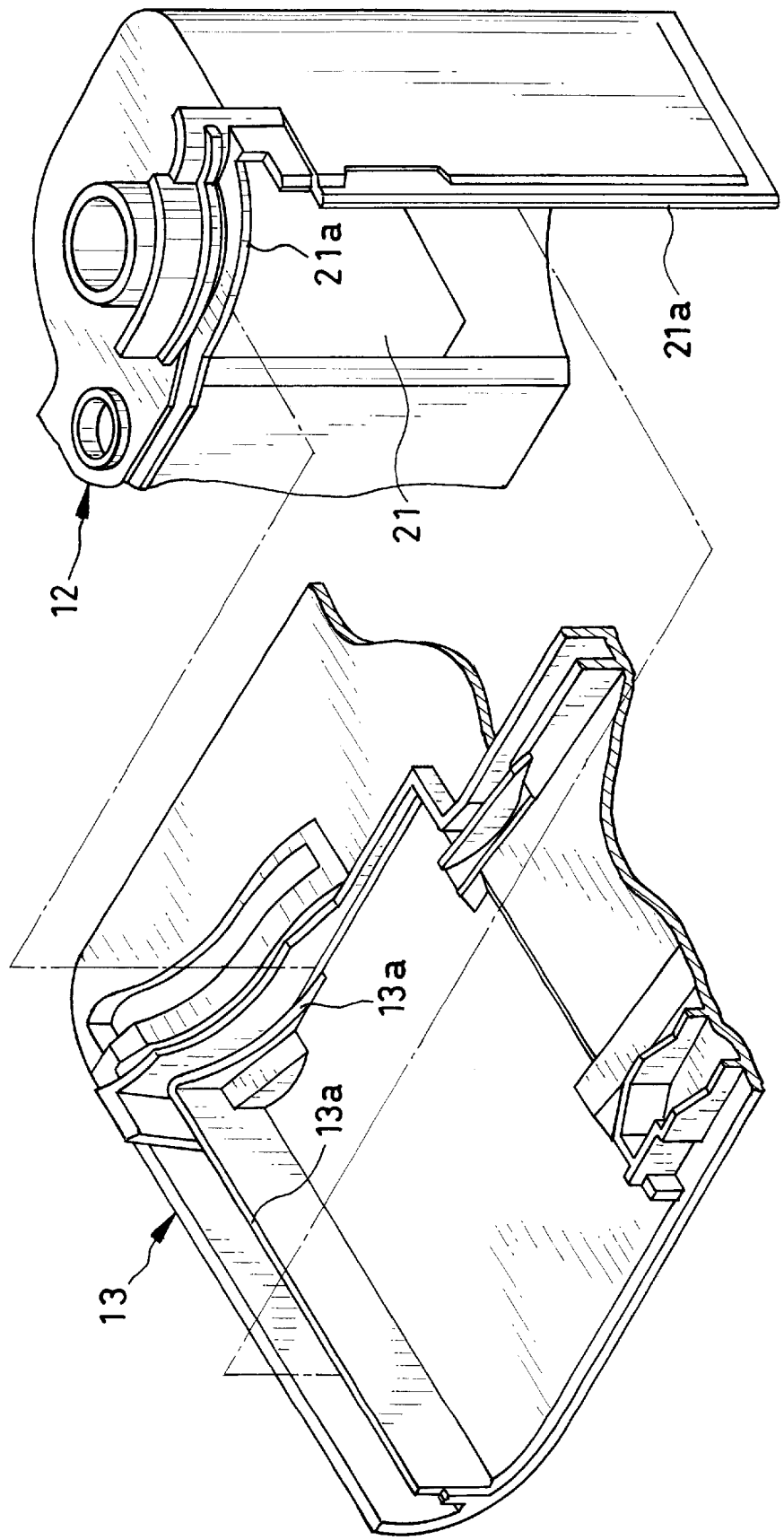
FIG. 8 is an exploded perspective, partially broken, illustrating portions of the rear cover and the main body constituting a cassette holder chamber.

The photo film cassette 18 is contained in the cassette holder chamber 21. In FIG. 8, top and end wall portions 21a define inner faces of the cassette holder chamber 21, and extend on a top side for engagement with the winder wheel 68 and on a lateral side of the lens-fitted photo film unit 2.

Also, light-shielding ridges 13a are formed on the rear cover 13 in positions opposed to the cassette holder chamber 21, and engageable with the top and end wall portions 21a.

The operation of the above-constructed lens-fitted photo film unit 2 is described now. As the front cover 16 is formed from the transparent resin, the exposure unit 14, the printed circuit board 44 and the like of the main body 12 are visible through the front cover 16 externally. Unlike the prior art in which the front cover 16 is black and opaque, the appearance of the lens-fitted photo film unit 2 can provide attractiveness and fashionableness from an esthetic point of view.

As the light-shielding ridge 59a is formed with the lens holder plate 59 to extend in a path direction of the exposure light path 52, the light-shielding ridge 59a surrounds the shutter blade 57 and the contact segments 42a of the synchro switch 42. It is possible to close a space which, according to the prior art, would be formed between the lens holder plate 59 and the exposure tunnel 32 of the exposure unit 14 for rotation of the shutter blade 57. Although the front cover 16 is transparent, no ambient light is allowed to enter the exposure light path 52, because ambient light entered through the front cover 16 is shielded by the light-shielding ridge 59a.

Furthermore, the light-shielding ridge 66a is extended in the rear cover 13 between the light-shielding ridges 66 and 67, the former of which is located close to the end wall of the housing 3. The end wall portion 72 of the roll holder chamber 23 is provided with the light-shielding ridge 23b protruding for a tight contact with the light-shielding ridge 65 of the rear cover 13. Also the shoulder portion 23c is disposed inside the roll holder chamber 23. Consequently, ambient light is prevented from entry between those engaging portions of the main body 12 and the rear cover 13.

Also the cassette holder chamber 21 has the top and end wall portions 21a, with which the light-shielding ridges 13a of the rear cover 13 are combined. Therefore the cassette holder chamber 21 is protected from ambient light reliably. According to the prior art, the inside of the roll holder chamber 23 or the cassette holder chamber 21 is shielded from light by combining the front cover 16, the rear cover 13 and the main body 12. In contrast the main body 12 and the rear cover 13 according to the present invention makes it possible to shield the roll holder chamber 23 and the cassette holder chamber 21 from light without cooperation of the front cover 16. Although the front cover 16 is transparent, no ambient light is allowed to enter the roll holder chamber 23 or the cassette holder chamber 21, because ambient light entered through the front cover 16 is shielded by the top and end wall portions 21a and the light-shielding ridges 13a.

In the above embodiment, the light-shielding ridge 67 is overlapped inside the top wall portion 70. The light-shielding ridges 66 and 66a are overlapped inside the end wall portion 72. Alternatively the light-shielding ridge 67 can be overlapped with an outer side of the top wall portion 70. The light-shielding ridges 66 and 66a can be overlapped with an outer side of the end wall portion 72. For such a structure, a groove or recess may be formed in a position outside the top wall portion 70 or the end wall portion 72 for receiving the light-shielding ridge 67 or the light-shielding ridges 66 and 66a.

In the above embodiment, the lens holder plate 59 is used. However, the taking lens 58 may be fixed directly to a lens opening formed in the front cover 16 without using the lens holder plate 59.

In the above embodiment, the light-shielding ridge 59a is formed along the edges of the lens holder plate 59. It is alternatively possible to secure a black frame-shaped member to at least one of front and rear faces of the front cover 16 in a quadrilateral portion corresponding to the light-shielding ridge 59a, or to color the same portion in black, so as to shield the rear of the lens holder plate 59 from ambient light.

Figure 16:
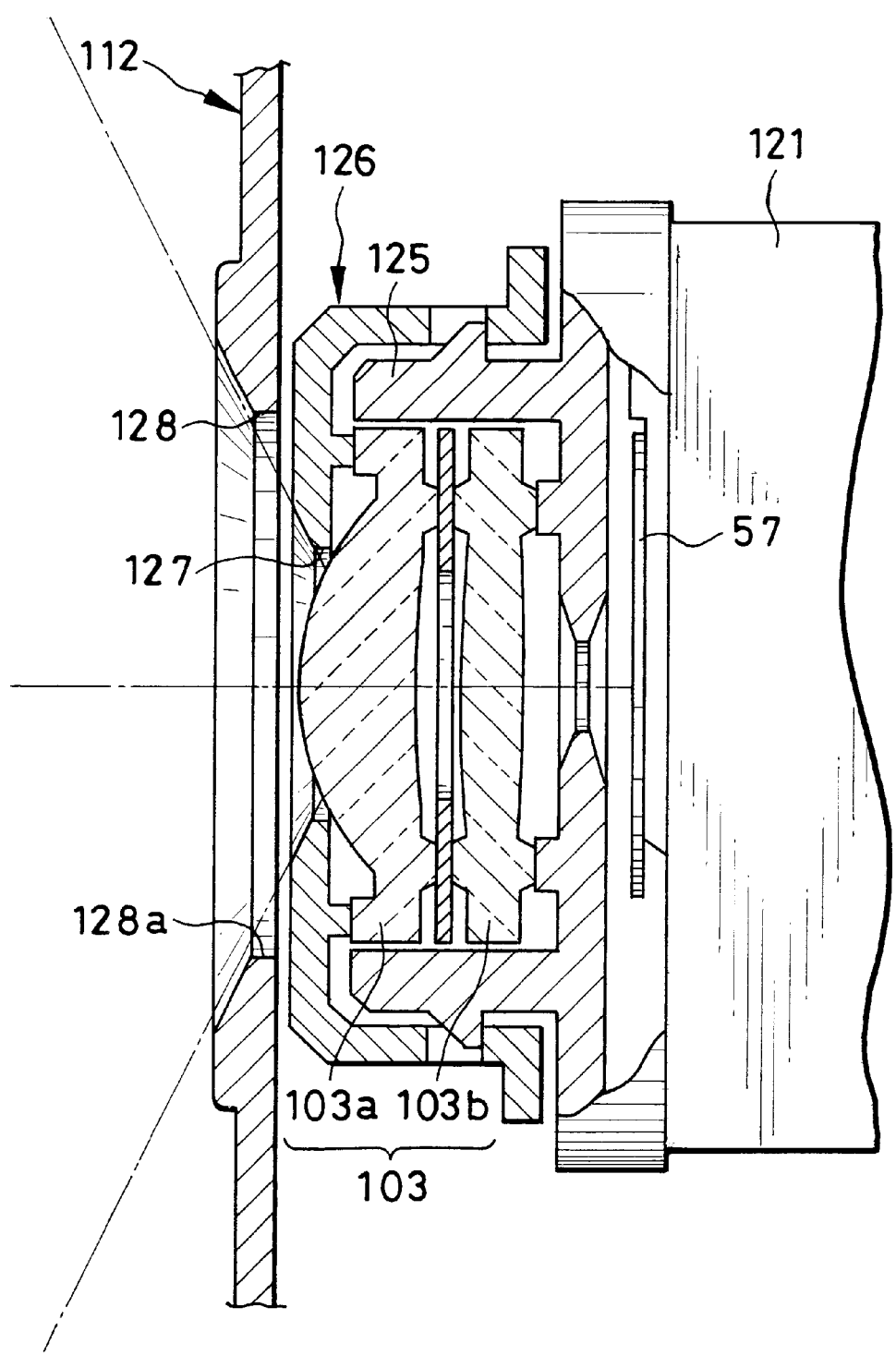
FIG. 16 is a cross section, partially broken, illustrating the prior art.

Another preferred embodiment including an improvement in a lens holder is described now. In FIG. 16, the prior art is described. A taking lens 103 is constituted by two lens elements 103a and 103b of resin, and fitted in a lens holder plate 125 on a front face of an exposure tunnel 121. A lens retainer plate 126 is mounted on the front of the lens holder plate 125, to keep the taking lens 103 sandwiched between the lens retainer plate 126 and the lens holder plate 125. A first opening 127 is formed in the lens retainer plate 126 for limiting object light coming upon the taking lens 103. Each of the exposure tunnel 121 and the lens retainer plate 126 is formed from resin provided with a light-shielding characteristic. Or the resin is opaque, and is black or has a dark color. A light path between the taking lens 103 and the photo film is kept light-tight.

If a front cover 112 in the lens-fitted photo film unit according to the prior art is made transparent, an inner surface 128a of a lens opening 128 at the taking lens 103 is illuminated and reflects or refracts light when the front cover 112 is subjected to ambient light. See FIG. 16. The light from the inner surface 128a becomes incident upon the taking lens 103, to cause a flare phenomenon. If the lens-fitted photo film unit incorporates an electronic flash unit in particular, flash light with high intensity from the flash emitter window is transmitted through the front cover 112 and comes to the lens opening 128, and then is caused by the inner surface 128a to become incident to the taking lens 103. The flash light, in a manner further than a flash phenomenon, is likely to cause an image or color of the front cover 112 to be recorded on the photo film.

Figure 9:
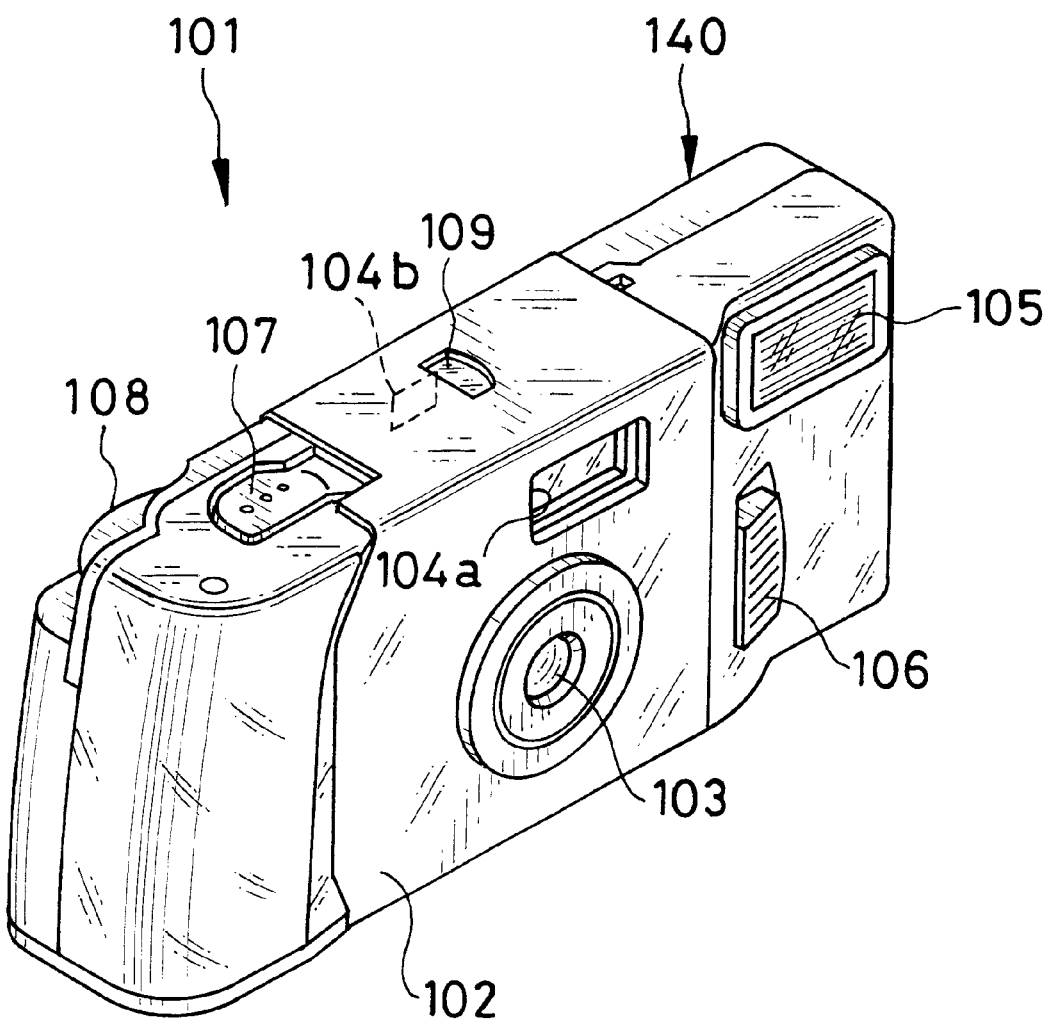
FIG. 9 is a perspective illustrating another preferred lens-fitted photo film unit.

In view of this situation, a preferred embodiment to solve those problems is described now. In FIG. 9, a lens-fitted photo film unit 101 has an outer belt 102, which is a cover and has a printed pattern for good appearance and printed information to users. Openings are formed in the outer belt 102 in the predetermined positions for exposing a taking lens 103, a viewfinder objective window 104a, a viewfinder eyepiece window 104b and a counter window 109 as elements of a housing 140 of the lens-fitted photo film unit 101.

Figure 10:
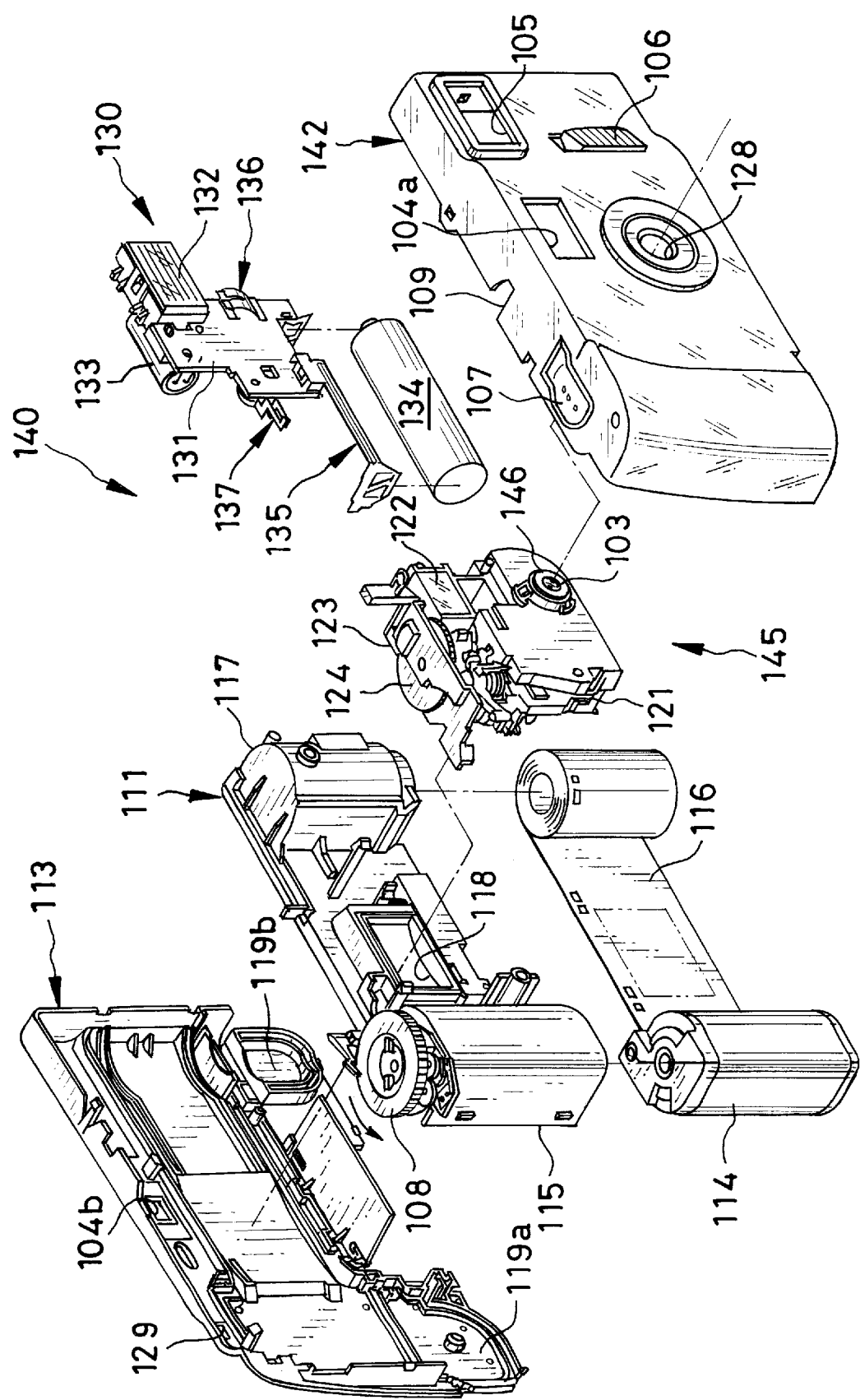
FIG. 10 is an exploded perspective illustrating the lens-fitted photo film unit.

In FIG. 10, the housing 140 includes a main body 111, a rear cover 113 and a front cover 142. There are a cassette holder chamber 115 and a roll holder chamber 117. The cassette holder chamber 115 contains a photo film cassette 114. Photo film 116 is drawn from the photo film cassette 114. The roll holder chamber 117 contains a roll of the photo film 116. An exposure aperture 118 is disposed between the cassette holder chamber 115 and the roll holder chamber 117, and defines a region in which the photo film 116 is exposable. Openings are formed in bottoms of the cassette holder chamber 115 and the roll holder chamber 117, and closed by bottom lids 119a and 119b formed with the rear cover 113. A winder wheel 108 is disposed on the top of the cassette holder chamber 115.

An exposure unit 145 is a combination including the taking lens 103, a viewfinder optical system, the shutter mechanism and a frame counter disk 124 assembled on an exposure tunnel 121. The viewfinder optical system is constituted by an objective lens 122 and an eyepiece lens 123.

In FIG. 10, an electronic flash unit 130 has a printed circuit board 131, which includes a flash circuit for control of charging and discharging. The printed circuit board 131 is provided with a flash emitter 132, a main capacitor 133, a battery holder 135, a charger switch 136 and a synchro switch 137. A dry battery 134 is supported in the battery holder 135. When a charger button 106 in the front cover 142 is slid up or down, the charger switch 136 is turned on or off. The main capacitor 133 is charged when the charger switch 136 is turned on. The synchro switch 137 consists of two segments parallel to each other, and turned on when the shutter blade is fully open to contact those with each other. If the synchro switch 137 is turned on while the charger switch 136 remains turned on, charge stored in the main capacitor 133 is discharged to cause the flash emitter 132 to emit flash light.

A flash emitter window 105 is formed in a front cover portion of the front cover 142 as well as the lens opening 128 and the viewfinder objective window 104a. A shutter button 107 is formed in a top cover portion of the front cover 142 as well as the counter window 109. An opening 129 is formed in the rear cover 113 as well as the viewfinder eyepiece window 104b.

A lens opening 128 is formed in the front cover 142. When the front cover 142 is fitted on the main body 111 with the rear cover 113, the taking lens 103 of the exposure unit 145 is externally positioned through the lens opening 128.

Figure 11:
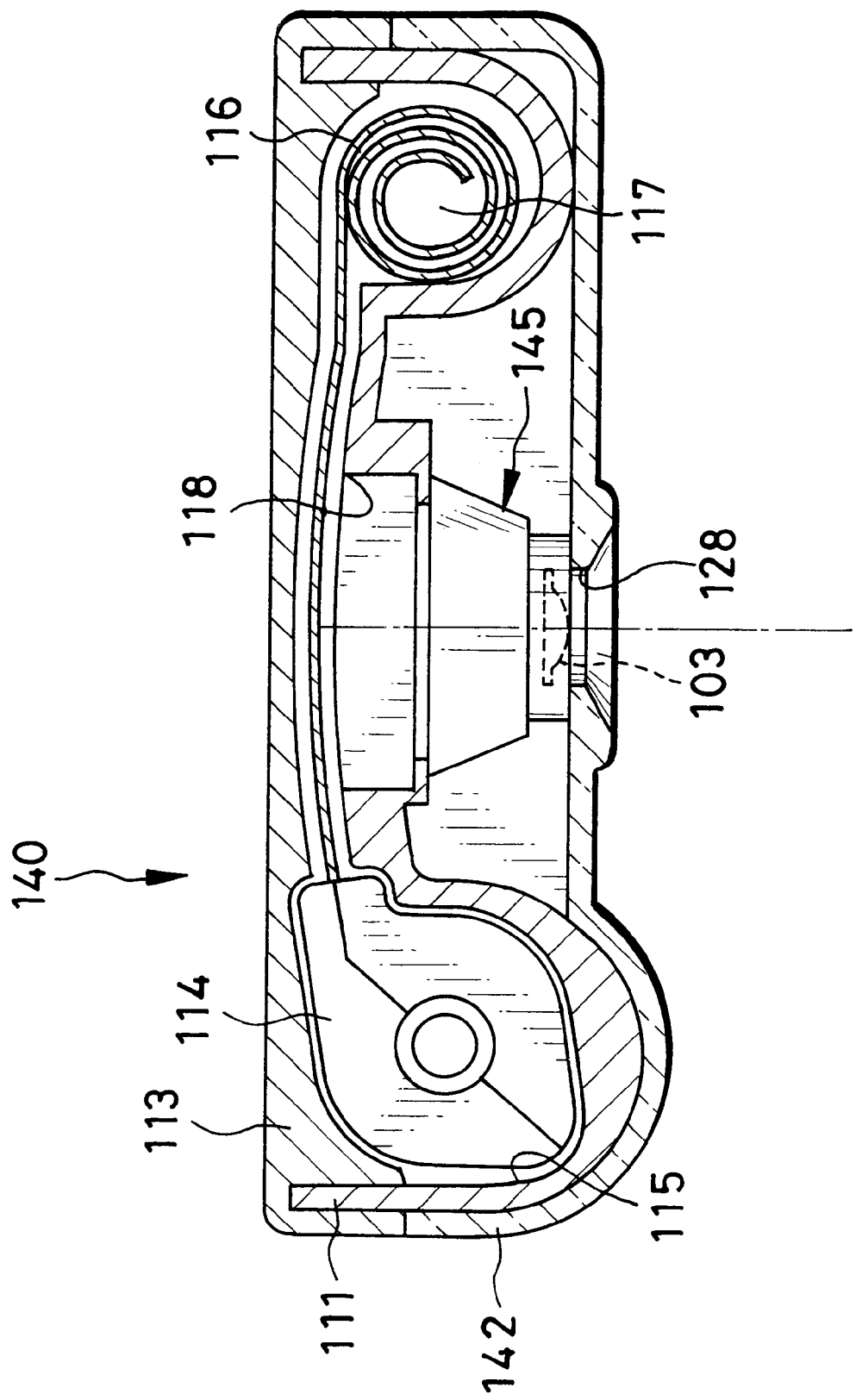
FIG. 11 is a horizontal section illustrating the lens-fitted photo film unit.

Also in FIG. 11, the lens-fitted photo film unit 101 is depicted. The main body 111 which contains the photo film 116 includes a base part formed from resin provided with a light-shielding characteristic, or resin which is opaque and has a dark color or black. Also the rear cover 113 and an exposure tunnel of the exposure unit 145 are formed from such resin with a light-shielding characteristic. The front cover 142, in contrast, is formed from transparent resin, which characterizes the appearance of the housing 140.

Figure 12:
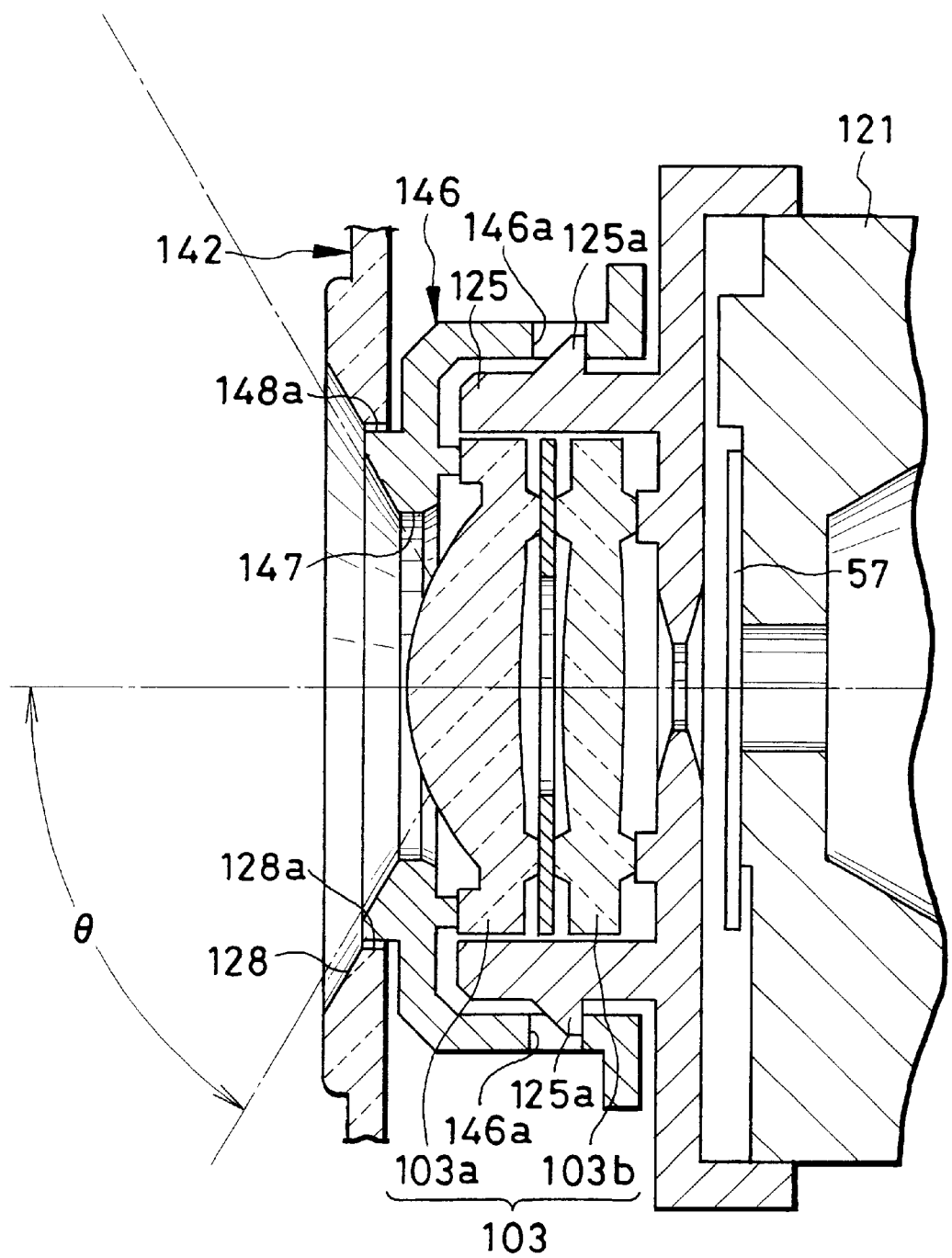
FIG. 12 is a cross section, partially broken, illustrating a front cover, a taking lens, a lens retainer plate and a lens holder plate at an exposure unit.

In FIG. 12, lens elements 103a and 103b of resin constitute the taking lens 103. A lens holder plate 125 is disposed in front of the exposure tunnel 121, and supports the lens elements 103a and 103b. A lens retainer plate 146 is positioned in front of the lens holder plate 125, and fixed to it by engagement of claws 125a and retainer holes 146a. Thus the taking lens 103 is kept sandwiched between the lens retainer plate 146 and the lens holder plate 125. Each of the exposure tunnel 121, the lens holder plate 125 and the lens retainer plate 146 is formed from resin with a light-shielding characteristic, or resin which is opaque and dark or black, so that the exposure light path for the taking lens 103 is protected from ambient light.

A first opening 147 is formed in the center of the lens retainer plate 146 for limiting object light coming upon the taking lens 103. A ring-shaped blocking projection 148 as blocking member is disposed to project from the lens retainer plate 146 around the first opening 147, and becomes inserted in the lens opening 128 in the front cover 142. An inner surface 128a of the lens opening 128 is fully covered by the ring-shaped blocking projection 148. It is to be noted that shapes of the ring-shaped blocking projection 148 and the lens opening 128 are so formed that they does not block the light path of object light directed to the taking lens 103.

Figure 13:
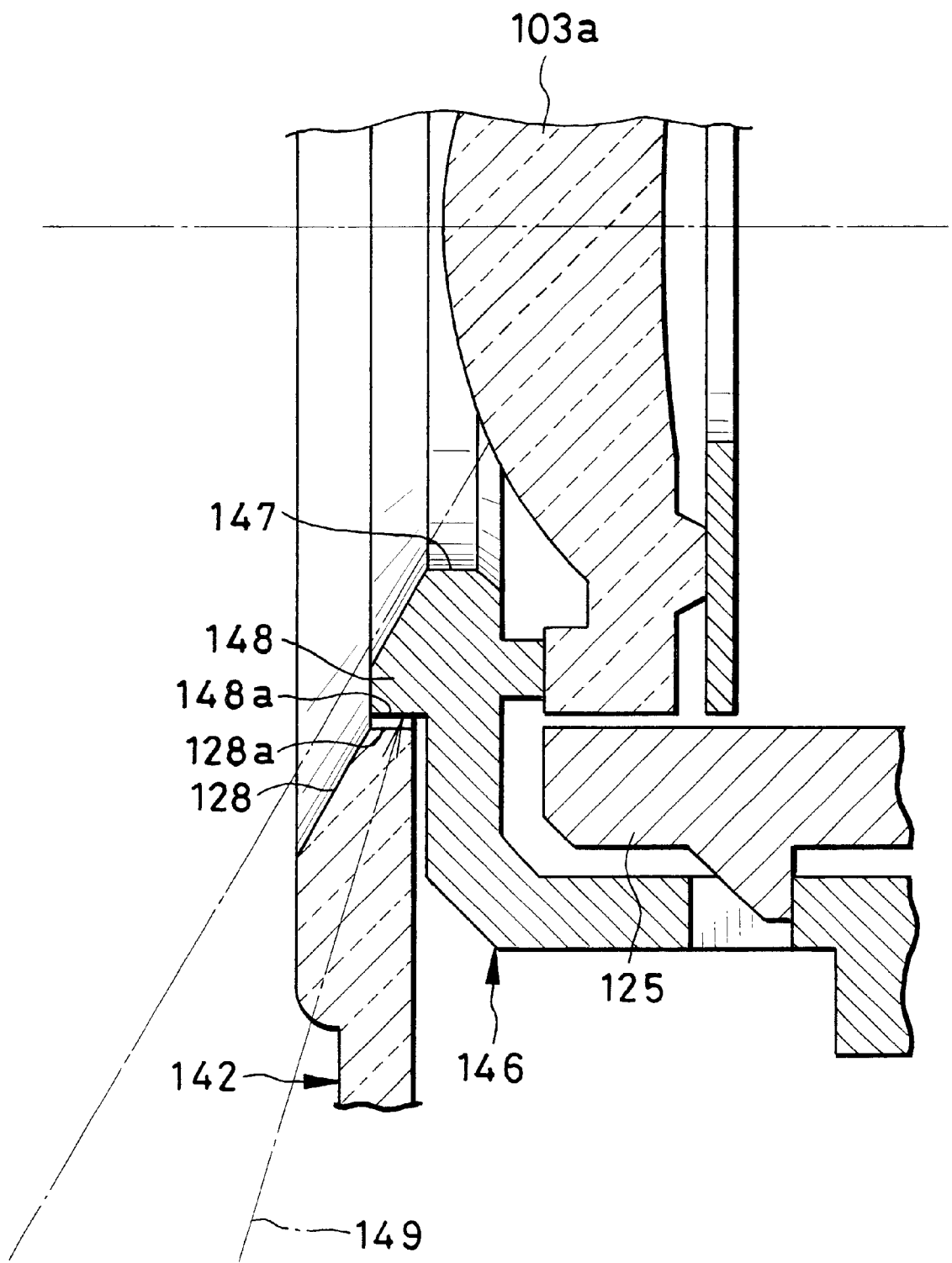
FIG. 13 is a cross section, partially broken, illustrating the same as FIG. 12 in enlargement.

FIG. 13 illustrates the operation of the present embodiment. In the housing 140, an outer surface 148a of the ring-shaped blocking projection 148 is opposed to the inner surface 128a of the lens opening 128. When the front cover 142 is subjected to strong ambient light such as sunlight, the inner surface 128a of the lens opening 128 is illuminated. But a path of refracted ambient light 149 is blocked by the ring-shaped blocking projection 148 and prevented from being incident upon the taking lens 103. This is because an inclined face of the ring-shaped blocking projection 148 restricts the path of the object light in a range of a maximum incident angle, a half of which is indicated by θ in FIG. 12.

Figure 14:
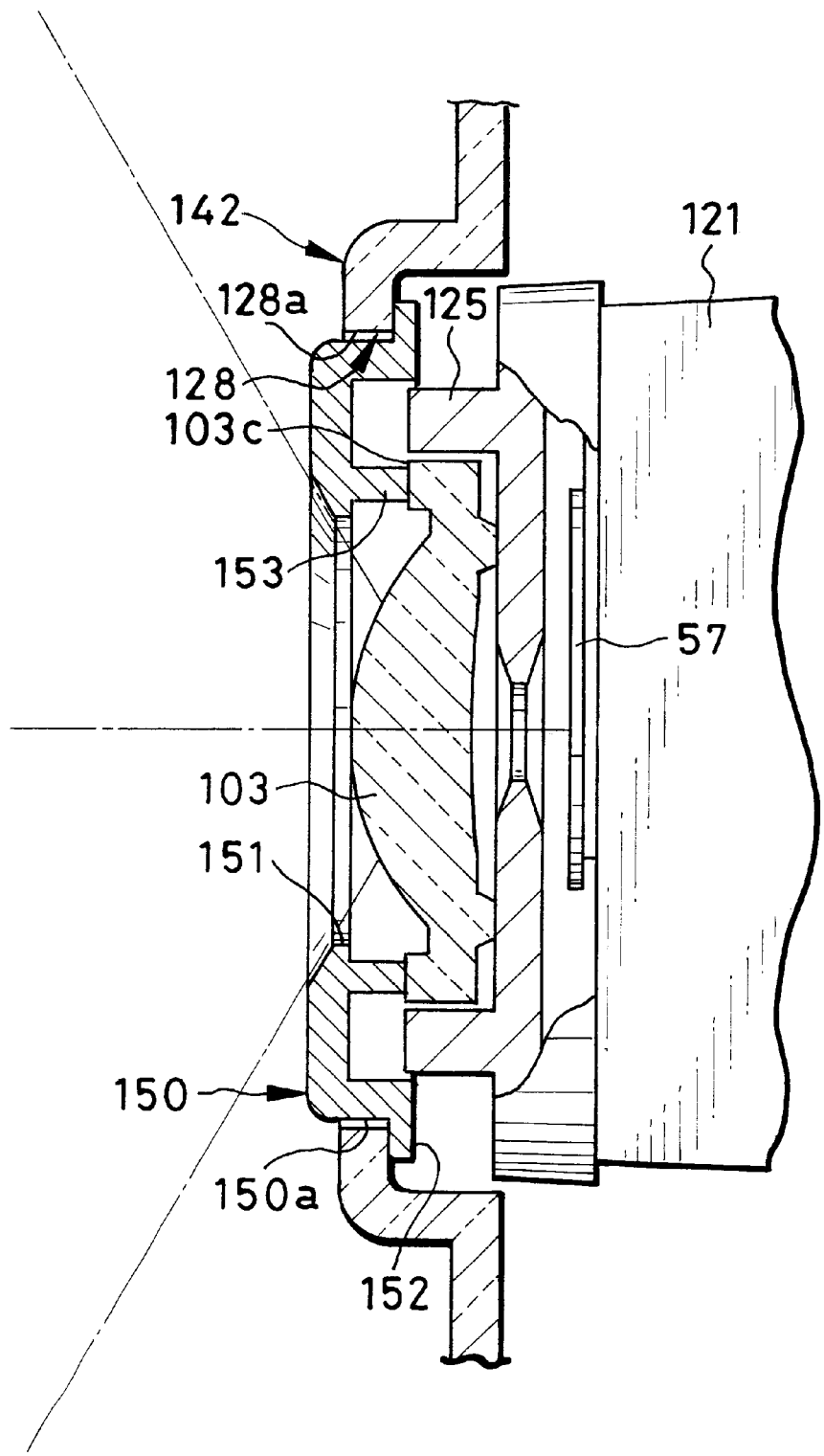
FIG. 14 is a cross section, partially broken, illustrating still another preferred embodiment in which a lens retainer plate is partially inserted in a front cover.

In FIG. 14, still another preferred embodiment is illustrated. The taking lens 103 consists of one lens element of resin, and is fitted in the lens holder plate 125 in front of the exposure tunnel 121. A lens retainer plate 150 is mounted on the front of the taking lens 103. Furthermore, the transparent front cover 142 is fitted on the front of the lens retainer plate 150. The lens retainer plate 150 is formed from resin with a light-shielding characteristic, and inserted in the lens opening 128 when the front cover 142 is fitted. An outer projection portion 150a of the lens retainer plate 150 is disposed to intercept light from the inner surface 128a of the lens opening 128.

A first opening 151 is formed in the center of the lens retainer plate 150 for limiting object light coming upon the taking lens 103. A flange 152 as retainer portion is formed in the periphery of the lens retainer plate 150 for contacting the peripheral edge of the lens opening 128 in a rear surface of the front cover 142. Also, an inner projection portion 153 as retainer portion is formed in the lens retainer plate 150 for contacting a peripheral portion 103c of the taking lens 103 to keep the taking lens 103 positioned on the lens holder plate 125.

Figure 15:
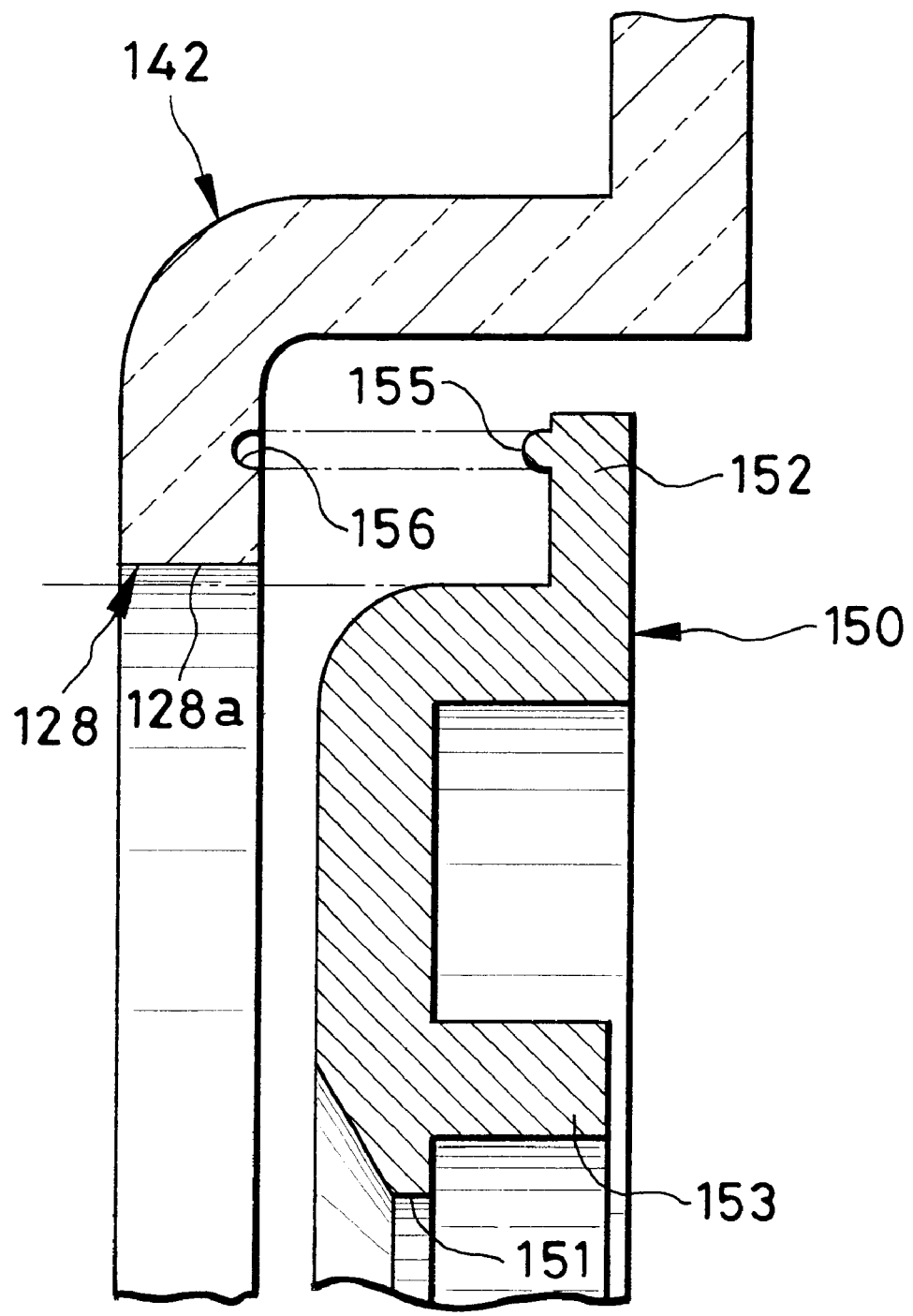
FIG. 15 is a cross section, partially broken, illustrating engaged portions of the front cover and the lens retainer plate.

In FIG. 15, plural projections 155 are formed on the flange 152. Plural recesses 156 are formed in a portion of the front cover 142 opposed to the flange 152. Each of the plural projections 155 is combined with one of the plural recesses 156. When the lens retainer plate 150 is fitted in the lens opening 128, the plural projections 155 are pushed into the plural recesses 156, so the lens retainer plate 150 is fixedly secured to the front cover 142. Note that arrangement of the plural projections 155 in the flange 152 and the plural recesses 156 in the front cover 142 is at a regular interval.

In operation, the insertion of the lens retainer plate 150 with the lens opening 128 causes the outer projection portion 150a of the lens retainer plate 150 sufficiently to block the inner surface 128a of the lens opening 128. Even when the front cover 142 is subjected to ambient light to a illuminate the inner surface 128a of the lens opening 128, no flare phenomenon occurs, because the ambient light is kept by the lens retainer plate 150 from coming to the taking lens 103.

When the front cover 142 is positioned in front of the taking lens 103, the lens retainer plate 150 is prevented by the flange 152 from moving in the forward direction, and prevented by the inner projection portion 153 from moving in the rearward direction. Thus the taking lens 103 can be positioned reliably without looseness between the lens retainer plate 150 and the lens holder plate 125.

As the lens retainer plate 150 and the front cover 142 have the plural projections 155 and the plural recesses 156, the lens retainer plate 150 can be previously mounted on the front cover 142. It is possible in an assembly process to handle the combination of the front cover 142 and the lens retainer plate 150 as a single member. During operation of the assembly, the lens retainer plate 150 can be kept from offsetting in the position, and can have suitability for being assembled.

In the above embodiment, the plural projections 155 and the plural recesses 156 are used for fixing the lens retainer plate 150. Also, a ring-shaped ridge and a ring-shaped groove may be disposed to surround the lens opening 128, for the purpose of engaging the edge of the lens retainer plate 150 with the periphery of the lens opening 128. This facilitates assembly of the lens retainer plate 150, because no positioning of the plural projections 155 relative to the plural recesses 156 is required. The lens retainer plate 150 can be simply inserted in the lens opening 128 without adjustment of its direction.

Furthermore, a diameter of the whole of the lens retainer plate 150 can be approximately equal to that of the lens opening 128, and can be inserted in the lens opening 128 in a tightly fitted manner. Thus it is unnecessary to form very small shapes such as the plural projections 155 or the plural recesses 156. Moldability of the lens retainer plate 150 and the front cover 142 is increased.

Also, the lens opening 128 according to the above embodiments may have any large size or any shape. The ring-shaped blocking projection 148 or the outer projection portion 150a of the lens retainer plate 150 may be constructed in compliance with the form of the lens opening 128. Furthermore, the lens opening 128 may not be formed in the front cover 142. Instead, the center of the front cover 142 may be constructed by a colorless transparent flat plate.

Instead of the ring-shaped blocking projection 148 and the ring-shaped light-shielding plate portion of the lens retainer plate 150, it is possible to secure a black ring-shaped sticker member or the like to an edge of the lens opening 128, or to color the same in black, so as to block ambient light.

The present invention is usable in any type of the lens-fitted photo film unit 2, 101. Typically in the flash built-in type, light reflected by the inner surface 128a of the lens opening 128 upon emission of flash light is considerably strong. Thus the construction of the present invention is effective in case the front cover 142 is transparent.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit including an opaque main body having a cassette holder chamber and a roll holder chamber each of which are open to a rear, said cassette holder chamber containing a photo film cassette, and said roll holder chamber containing a roll of photo film drawn from said photo film cassette, said lens-fitted photo film unit comprising:

a front cover, transparent at least partially, for covering a front side of said main body;

an opaque rear cover for covering a rear side of said main body to close said rear of said cassette holder chamber and said roll holder chamber:

a top wall portion and an end wall portion of said roll holder chamber, said end wall portion being disposed farther from said cassette holder chamber;

a first light-shielding ridge, disposed to project forwards from said rear cover and to extend horizontally, overlapped with said top wall portion, for blocking entry of ambient light at said top wall portion;

a second light-shielding ridge, disposed to project forwards from said rear cover and to extend vertically, overlapped with said end wall portion, for blocking entry of ambient light at said end wall portion, said second light-shielding ridge extending to said first light-shielding ridge;

a third light-shielding ridge, formed to project from said rear cover and to extend along an outside of said second light-shielding ridge, and disposed outside said end wall portion; and a fourth light-shielding ridge, formed to project from an outside of said end wall portion so that when the main body and the rear cover are assembled, a side of the fourth light-shielding ridge is in contact with an end face of said third light-shielding ridge.

2. A lens-fitted photo film unit as defined in claim 1, further comprising an auxiliary ridge portion, formed to project from said rear cover and to extend along a top of said first light-shielding ridge, and overlapped with a top of said top wall portion.

3. A lens-fitted photo film unit as defined in claim 1, further comprising a shoulder portion, disposed inside said roll holder chamber to extend along an inside of said end wall portion, said second light-shielding ridge having an end extending toward said shoulder portion.

4. A lens-fitted photo film unit as defined in claim 1, further comprising:
- a second top wall portion and a second end wall portion of said cassette holder chamber, said second end wall portion being disposed farther from said roll holder chamber;
- a fifth light-shielding ridge, disposed to project forwards from said rear cover and to extend horizontally, overlapped with said second top wall portion, for blocking entry of ambient light at said second top wall portion; and
- a sixth light-shielding ridge, disposed to project forwards from said rear cover and to extend vertically, overlapped with said second end wall portion, for blocking entry of ambient light at said second end wall portion, said sixth light-shielding ridge extending to said fifth light-shielding ridge.

5. A lens-fitted photo film unit as defined in claim 1, further comprising:
- an exposure tunnel, disposed between a taking lens and said photo film, for introducing light passed through said taking lens to said photo film;
- a shutter blade disposed in a front face of said exposure tunnel;
- a lens holder secured in front of said exposure tunnel with a gap to said front face of said exposure tunnel, said taking lens being secured to said lens holder;
- a light-shielding member, formed with an edge of said lens holder to project toward said exposure tunnel, for preventing light passed through said gap from entry into said exposure tunnel.

6. A lens-fitted photo film unit including an opaque main body having a cassette holder chamber and a roll holder chamber each of which are open to a rear, said cassette holder chamber containing a photo film cassette, and said roll holder chamber containing a roll of photo film drawn from said photo film cassette, said lens-fitted photo film unit comprising:
- a front cover, transparent at least partially, for covering a front side of said main body;
- an opaque rear cover for covering a rear side of said main body to close said rear of said cassette holder chamber and said roll holder chamber;
- an exposure tunnel, disposed between a taking lens and said photo film, for introducing light passed through said taking lens to said photo film;
- a shutter blade disposed in a front face of said exposure tunnel;
- a lens holder secured in front of said exposure tunnel with a gap to said front face of said exposure tunnel, said taking lens being secured to said lens holder;
- a light-shielding member, formed with an edge of said lens holder to project toward and contact an exterior of said exposure tunnel, so that light passing through said gap is prevented from entering into said exposure tunnel.

7. A lens-fitted photo film unit as defined in claim 6, further comprising:
- an electronic flash unit for illuminating a photographic field with flash light; and
- a synchro switch, disposed between said exposure tunnel and said lens holder, for activating said flash unit upon actuation of said shutter blade.

8. A lens-fitted photo film unit including an opaque main body having a cassette holder chamber and a roll holder chamber each of which are open to a rear, said cassette holder chamber containing a photo film cassette, and said roll holder chamber containing a roll of photo film drawn from said photo film cassette, said lens-fitted photo film unit comprising:
- a front cover, transparent at least partially, for covering a front side of said main body;
- an opaque rear cover for covering a rear side of said main body to close said rear of said cassette holder chamber and said roll holder chamber;
- a top wall portion and an end wall portion of said cassette holder chamber, said end wall portion being disposed farther from said roll holder chamber;
- a first light-shielding ridge, disposed to project forwards from said rear cover and to extend horizontally, overlapped with said top wall portion, for blocking entry of ambient light at said top wall portion;
- a second light-shielding ridge, disposed to project forwards from said rear cover and to extend vertically, overlapped with said end wall portion, for blocking entry of ambient light at said end wall portion, said second light-shielding ridge extending to said first light-shielding ridge; and
- a third light-shielding ridge, formed to project from said rear cover and to extend along an outside of said second light-shielding ridge, and disposed outside said end wall portion.

9. A lens-fitted photo film unit comprising:
- an opaque main body preloaded with photo film;
- a rear cover secured behind said main body;
- a front cover, transparent at least partially, and secured in front of said main body;
- a lens holder disposed between said main body and said front cover;
- a taking lens secured to said lens holder;
- a lens opening, formed in said front cover, for introducing object light to said taking lens;
- a blocking member, disposed inside an edge of said lens opening, for blocking advance of light beyond a predetermined incident angle to said taking lens;
- wherein the blocking member is arranged to block light reflecting off of an inner surface of the lens opening of the front cover so that the reflected light cannot reach the taking lens.

10. A lens-fitted photo film unit as defined in claim 9, further comprising:
- a lens retainer plate for keeping said taking lens on said lens holder;
- a first opening, formed in a middle of said lens retainer plate, for introducing said object light to said taking lens;

wherein said blocking member is formed with said lens retainer plate and has an inclined face inclined at said predetermined incident angle from an edge of said first opening to said lens opening.

11. A lens-fitted photo film unit as defined in claim 10, wherein said blocking member is a ring-shaped projection projecting from said lens retainer plate and inserted in said lens opening.

12. A lens-fitted photo film unit as defined in claim 10, wherein a front end of said blocking member is disposed behind a front surface of said front cover.

13. A lens-fitted photo film unit as defined in claim 12, further comprising a claw for securing said lens retainer plate to said lens holder.

14. A lens-fitted photo film unit as defined in claim 10, wherein said lens retainer plate keeps said taking lens on said lens holder by being sandwiched with said taking lens between said front cover and said lens holder.

15. A lens-fitted photo film unit as defined in claim 14, wherein said lens retainer plate includes:

a ring-shaped plate portion, having said first opening and said inclined face, said inclined face being formed with said first opening;

an outer projection portion disposed to project rearwards from an outer edge of said ring-shaped plate portion;

a flange, disposed on an edge of said outer projection portion, for contacting a rear of an edge of said lens opening;

an inner projection portion, disposed to project rearwards from said ring-shaped plate portion, for contacting a periphery of said taking lens.

16. A lens-fitted photo film unit as defined in claim 14, wherein said ring-shaped plate portion extends to a front of a front surface of said front cover.

17. A lens-fitted photo film unit as defined in claim 14, further comprising retainer means having a projection and a recess, of which one is formed in said flange and a remainder is formed in said edge of said lens opening behind said front cover, and which are engaged with each other for retention thereof.

18. The lens-fitted photo film unit of claim 7, wherein the synchro switch comprises two electrodes which extend through the light-shielding member in a light-tight manner.

* * * * *